(12) United States Patent
Papas et al.

(10) Patent No.: US 12,354,245 B2
(45) Date of Patent: Jul. 8, 2025

(54) HYBRID TWO-DIMENSIONAL AND THREE-DIMENSIONAL DENOISER

(71) Applicants: Disney Enterprises, Inc., Burbank, CA (US); ETH Zürich (EIDGENÖSSISCHE TECHNISCHE HOCHSCHULE ZÜRICH), Zurich (CH)

(72) Inventors: Marios Papas, Opfikon (CH); Gerhard Roethlin, Horw (CH); Tunc Ozan Aydin, Zürich (CH); Xianyao Zhang, Zürich (CH); Farnood Salehi, Zurich (CH); Shilin Zhu, Emeryville, CA (US)

(73) Assignees: Disney Enterprises, Inc., Burbank, CA (US); ETH Zürich (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 0 days.

(21) Appl. No.: 18/670,515

(22) Filed: May 21, 2024

(65) Prior Publication Data
US 2024/0394850 A1 Nov. 28, 2024

Related U.S. Application Data

(60) Provisional application No. 63/468,461, filed on May 23, 2023.

(51) Int. Cl.
G06T 5/70 (2024.01)
G06T 3/067 (2024.01)
G06T 5/60 (2024.01)
G06T 9/00 (2006.01)
G06T 15/00 (2011.01)

(52) U.S. Cl.
CPC ............ *G06T 5/70* (2024.01); *G06T 3/067* (2024.01); *G06T 5/60* (2024.01); *G06T 9/00* (2013.01);
(Continued)

(58) Field of Classification Search
CPC .. G06T 5/70; G06T 5/60; G06T 3/067; G06T 9/00; G06T 15/00; G06T 2200/04;
(Continued)

(56) References Cited

U.S. PATENT DOCUMENTS 10,096,088 B2 10/2018 Bitterli et al.
10,565,685 B2 2/2020 Adler et al.
(Continued)

OTHER PUBLICATIONS

Steve Bako, Thijs Vogels, Brian McWilliams, Mark Meyer, Jan Novak, Alex Harvill, Pradeep Sen, Tony Derose, Fabrice Rousselle "Kernel-Predicting Convolutional Networks for Denoising Monte Carlo Renderings" ACM Transactions on Graphics, vol. 36, No. 4, Article 97 Jul. 2017 14 Pgs.
(Continued)

*Primary Examiner* — Nathan J Flynn
(74) *Attorney, Agent, or Firm* — Farjami & Farjami LLP

(57) ABSTRACT

A system includes a pre-processor configured to receive three-dimensional (3-D) image data, flatten the 3-D image data to produce corresponding two-dimensional (2-D) image data, and concatenate the 3-D image data and the corresponding 2-D image data to provide concatenated image data. The system further includes an encoder including one or more first neural networks (NNs), the encoder configured to use the one or more first NNs to encode the concatenated image data to provide encoded data, a decoder including one or more second NNs, the decoder configured to use the one or more second NNs to decode the encoded data to provide decoded data, and a reconstructor including a plurality of hybrid 2-D/3-D reconstructors configured to reconstruct the decoded data to provide a denoised 3-D output image corresponding to the 3-D image data.

20 Claims, 7 Drawing Sheets

(52) U.S. Cl.
CPC .......... *G06T 15/00* (2013.01); *G06T 2200/04* (2013.01); *G06T 2207/20081* (2013.01); *G06T 2207/20084* (2013.01); *G06T 2207/20182* (2013.01)

(58) Field of Classification Search
CPC . G06T 2207/20081; G06T 2207/20182; G06T 2207/20084
See application file for complete search history.

(56) References Cited

U.S. PATENT DOCUMENTS

| | | |
|---|---|---|
| 10,572,979 B2 | 2/2020 | Vogels et al. |
| 2018/0293496 A1 | 10/2018 | Vogels et al. |
| 2019/0304067 A1 | 10/2019 | Vogels et al. |
| 2019/0304068 A1 | 10/2019 | Vogels et al. |
| 2020/0027198 A1 | 1/2020 | Vogels et al. |
| 2023/0109328 A1 | 4/2023 | Papas et al. |
| 2023/0342885 A1* | 10/2023 | Zhao .......................... G06T 5/70 |

OTHER PUBLICATIONS

Brent Burley, David Adler, Matt Jen-Yuan Chiang, Hank Driskill, Ralf Habel, Patrick Kelly, Peter Kutz, Yining Karl Li, Daniel Teece "The Design and Evolution of Disney's Hyperion Renderer" ACM Transactions on Graphics, vol. 37, No. 3, Article 33 Jul. 2018 22 Pgs.

J. Hasselgren, J. Munkberg, M. Salvi, A. Patney, and A. Lefohn "Neural Temporal Adaptive Sampling and Denoising" Computer Graphics Forum (Proceedings of Eurographics 2020) May 25, 2020 9 Pgs.

Andrew G. Howard, Menglong Zhu, Bo Chen, Dmitry Kalenichenko, Weijun Wang, Tobias Weyand, Marco Andreetto, Hartwig Adam "MobileNets: Efficient Convolutional Neural Networks for Mobile Vision Applications" arXiv 2017 9 Pgs.

Cyril Corvazier Benjamin Legros, Rachid Chikh "OpenEXR/Id: Isolate and object with a perfect antialiasing" SIGGRAPH' 16, Jul. 24-28, 2016 Anaheim, CA 2 Pgs.

Jonathan Egstad, Mark Davis, Dylan Lacewell "Improved Deep Image Compositing Using Subpixel Masks" DigiPRO'15: Proceedings of the 2015 Symposium on Digital Production Aug. 8, 2015 7 Pgs.

"Large-scale machine learning on heterogeneous systems" arXiv 2016 Mar. 14, 2016 10 Pgs.

Tom Duff "Deep Compositing Using Lie Algebras" ACM Trans. Graph. 36, 3, Article 26 (Mar. 2017), 12 pages.

* cited by examiner

HYBRID TWO-DIMENSIONAL AND THREE-DIMENSIONAL DENOISER

RELATED APPLICATIONS

The present application claims the benefit of and priority to a U.S. Provisional Patent Application Ser. No. 63/468,461 filed on May 23, 2023, and titled "Depth-Aware Neural Denoising for Deep-Z Monte Carlo Renderings," which is hereby incorporated fully by reference into the present application.

BACKGROUND

Compositing is an important step in the production of animated films and visual effects, in which different parts of a frame are post-processed and fine-tuned independently before being merged together. Three-dimensional (3-D) images, such as deep-Z images for example, contain a variable number of bins per pixel at different depths, each of which records the color and opacity, or "alpha," at the corresponding depth. As a result, 3-D images can advantageously provide more accurate opacity and avoid edge artifacts in compositing because those 3-D images can cleanly separate distinct geometric boundaries in different bins.

However, path-traced 3-D images generated by renderers presently used in production suffer from the same problem as flat two-dimensional (2-D) images, i.e., noise. Noise reduces the quality of the compositing operations and increases the difficulty of achieving a desired artistic effect. The absence in the conventional art of a denoising solution for 3-D images that can compete with the quality of denoisers on flat 2-D images is one of the primary factors inhibiting the use of 3-D images in production. For example, the present state-of-the-art deep-Z image denoising approach, which filters each bin based on information from neighboring bins, produces artifacts such as residual noise or splotches and is computationally expensive.

Although it is possible to apply state-of-the-art neural network-based denoisers for flat 2-D images to 3-D images after compositing, such a workflow is undesirable in that it requires artists to operate on noisy data or have a denoiser run after every compositing operation. Moreover, some compositing operations, such as non-linear functions, when applied to the bin colors, can result in degraded denoising quality for flat 2-D denoisers. Thus, there is a need in the art for a denoising solution customized for use on 3-D images.

DETAILED DESCRIPTION

Figure 1:
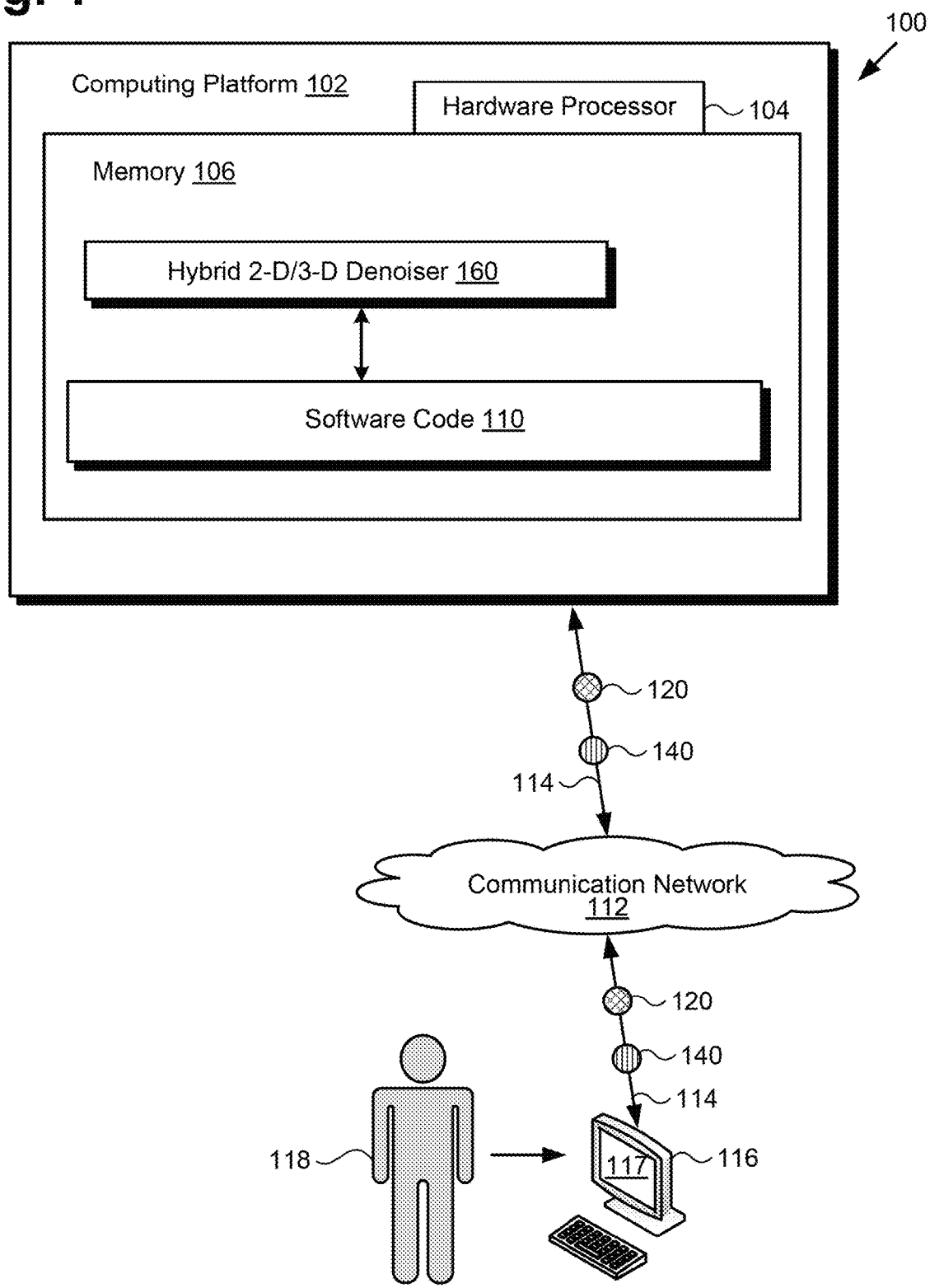
FIG. 1 shows an exemplary system for denoising three-dimensional (3-D) images, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, three-dimensional (3-D) images, such as deep-Z images for example, contain a variable number of bins per pixel at different depths, each of which records the color and opacity (hereinafter "alpha") at the corresponding depth. As a result, 3-D images can advantageously provide more accurate opacity and avoid edge artifacts in compositing because those 3-D images can cleanly separate distinct geometric boundaries in different bins.

However, 3-D images generated by renderers presently used in production tend to be noisy. As further stated above, noise reduces the quality of the compositing operations and increases the difficulty of achieving the desired artistic effect. The absence in the conventional art of a denoising solution for 3-D images that can compete with the quality of denoisers on flat 2-D images is one of the primary factors inhibiting the use of 3-D images in production. For example, the present state-of-the-art deep-Z image denoising approach, which filters each bin based on information from neighboring bins, produces artifacts such as residual noise or splotches and is computationally expensive.

It is noted that denoising 3-D images is fundamentally more challenging than denoising flat 2-D images. A 3-D image denoiser, such as a deep-Z denoiser, whose input and output are both 3-D images, aims to produce an accurate noise-free reconstruction of the color values in all bins. By contrast, a flat 2-D image denoiser focuses on reconstructing only one value per pixel. A 3-D image denoiser should additionally accurately reconstruct per-bin alpha and depth values, which are also subject to noise during path tracing. Moreover, a bin in a noisy 3-D image aggregates only a fraction of the paths traced for the associated pixel and is likely to exhibit a higher amount of noise than the pixel value which aggregates all path samples.

The deep-Z format, for example, unlike the 2-D image format, is essentially semi-structured since each deep pixel, depending on the complexity of the depth information, can have different numbers of bins at arbitrary depth positions. This can be problematic for conventional convolutional architectures and kernel-predicting denoising because the neighborhood of each bin is defined by the bin index, which does not necessarily align with the neighborhood in depth space, where neighboring bins useful for denoising are more likely to be found. Such misalignment creates artifacts when denoising with convolutional neural networks (CNNs) applied on the spatial-bin dimensions, which rely on assumptions about translation invariance along all three dimensions.

It is noted that a neural network (hereinafter "NN") refers to a computational model for making predictions based on patterns learned from samples of data or "training data." Various learning algorithms can be used to map correlations between input data and output data. These correlations form the computational model that can be used to make future predictions on new input data. Moreover, a "deep neural network," in the context of deep learning, may refer to a NN that utilizes multiple hidden layers between input and output layers, which may allow for learning based on features not explicitly defined in raw data. As used in the present application, any feature identified as a NN refers to a deep neural network.

The present application addresses the deficiencies in the conventional art described above, with a focus on deep-Z image denoising, by disclosing a CNN-based neural deep-Z denoiser that overcomes the aforementioned challenges to 3-D image denoising and achieves high-quality denoising of deep-Z images. The denoising solution disclosed in the present application utilizes a neural network-based hybrid 2-D and 3-D architecture to improve denoising of flat image regions and uses depth as a prior for aligning bin neighborhoods. The present 3-D image denoising solution advances the state-of-the-art by introducing a denoiser capable of producing high-quality denoised 3-D images while being significantly more efficient than previous non-neural methods. The hybrid 2-D/3-D denoiser disclosed herein adopts a hybrid 2-D/3-D network architecture with flattened pixel context and learned combination of flat and deep reconstruction. The present 3-D image denoising solution further advances the state-of-the-art by introducing a light-weight depth-aware neighbor indexing of the input of convolutions and denoising kernels that addresses depth misalignment in 3-D image data.

It is noted that in some use cases the 3-D image denoising solution disclosed by the present application may advantageously be implemented as substantially automated systems and methods. As used in the present application, the terms "automation," "automated" and "automating" refer to systems and processes that do not require the participation of a human system operator. Thus, the methods described in the present application may be performed under the control of hardware processing components of the disclosed systems.

FIG. 1 shows exemplary system 100 for denoising 3-D images, according to one implementation. As shown in FIG. 1, system 100 includes computing platform 102 having hardware processor 104 and memory 106 implemented as a non-transitory storage medium. According to the present exemplary implementation, memory 106 stores software code 110 and hybrid 2-D/3-D denoising system (hereinafter "hybrid 2-D/3-D denoiser") 160.

As further shown in FIG. 1, system 100 is implemented within a use environment including communication network 112 providing network communication links 114, user 118, who may be an artist for example, and user system 116 utilized by user 118 to interact with system 100 via communication network 112 and network communication links 114. Also shown in FIG. 1 are display 117 of user system 116, 3-D image 120 received by system 100 from user system 116, and 3-D output image 140, which corresponds to 3-D image 120 and is provided to user system 116 by system 100. It is noted that 3-D image 120 includes a plurality of pixels, with each pixel having a plurality of bins with respective depth values. In some implementations, 3-D image 120 may be a deep-Z image, for example. Moreover, according to the exemplary use case depicted by FIG. 1, 3-D image 120 is a noisy image, while 3-D output image 140 corresponding to 3-D image 120 is a denoised image that has been denoised by software code 110, executed by hardware processor 104 of system 100, and using hybrid 2-D/3-D denoiser 160.

Memory 106 of system 100 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM) and FLASH memory.

Moreover, in some implementations, system 100 may utilize a decentralized secure digital ledger in addition to memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 1 depicts software code 110 and hybrid 2-D/3-D denoiser 160 as being co-located in a single instance of memory 106, that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and memory 106 may correspond to distributed processor and memory resources within system 100, while software code 110 and hybrid 2-D/3-D denoiser 160 may be stored remotely from one another on the distributed memory resources of system 100.

Hardware processor 104 may include a plurality of hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence applications such as machine-learning modeling.

In some implementations, computing platform 102 may correspond to one or more web servers, accessible over a packet-switched network such as the Internet, for example.

Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance to communicate with user system 116. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC). Thus, in some implementations, communication network 112 may be or include a 10 GigE network or an Infiniband network, for example.

Although user system 116 is depicted as a desktop computer in FIG. 1, that representation is merely exemplary. In various use cases, user system 116 may take the form of a tablet computer, laptop computer, smartphone, or an augmented reality (AR) or virtual reality (VR) device, for example, providing display 117. In other implementations, user system 116 may be a peripheral device of system 100 in the form of a "dumb" terminal. In those implementations, user system 116 may be controlled by hardware processor 104 of computing platform 102.

With respect to display 117 of user system 116, display 117 may take the form of a liquid crystal display (LCD), a light-emitting diode (LED) display, an organic light-emitting diode (OLED) display, a quantum dot (QD) display, or any other suitable display screen that performs a physical transformation of signals to light. Furthermore, display 117 may be physically integrated with user system 116 or may be communicatively coupled to but physically separate from user system 116. For example, where user system 116 is implemented as a smartphone, laptop computer, tablet computer, or an AR or VR device, display 117 will typically be integrated with user system 116. By contrast, where user system 116 is implemented as a desktop computer, display 117 may take the form of a monitor separate from user system 116 in the form of a computer tower.

Figure 2:
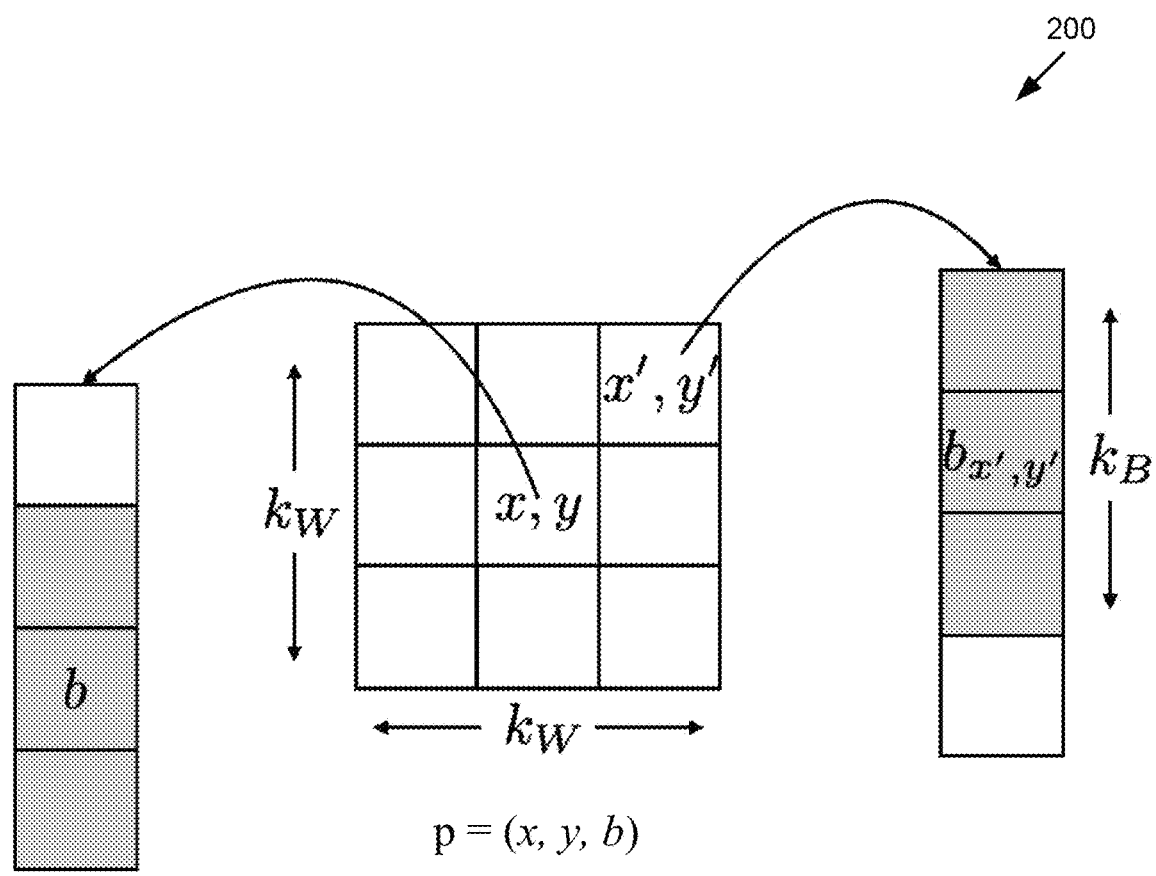
FIG. 2 shows a diagram depicting depth-aware indexing of 3-D image depth bins, according to one implementation.

FIG. 2 shows diagram 200 depicting depth-aware indexing of 3-D image depth bins, according to one implementation. It is noted that conventional neural 2-D denoisers typically utilize a CNN to identify useful neighboring pixels, and predict per-pixel filter denoising kernels for final reconstruction. These 2-D kernel-predicting CNNs are not directly applicable for denoising 3-D images, such as deep-Z images, due to the additional bin dimension. Nevertheless, reusing information from neighboring pixels, which motivates the use of kernel-predicting CNNs, is also conceptually valid for 3-D image denoising, and the present application discloses a 3-D image denoising solution that embraces that concept along with depth-aware indexing of bin neighborhoods to combat misalignment in 3-D image data. Applying convolutions and denoising kernels on depth-aware bin neighborhoods is more effective at finding relevant bins in neighboring pixels.

Referring to FIG. 1 and diagram 200 in FIG. 2, the input to 3-D denoising kernels included as part of hybrid 2-D/3-D denoiser 160 is defined as a subset of neighboring bins selected based on depth information. Conventional $k_W \times k_W \times k_B$ convolutions (where $k_W=2r_W+1$ and $k_B=2r_B+1$) process feature maps with a regular cuboid grid pattern, centered around the bin p=(x, y, b). For the 3-D denoising kernels of hybrid 2-D/3-D denoiser 160, the regular square pattern is retained in the x and y dimensions. For each neighboring pixel (x', y') with $|x'-x| \le r_W$ and $|y'-y| \le r_W$, the bin $b_{x',y'}$ closest (in depth) to the center bin p is identified. The $2r_B+1$ bins centered around $b_{x',y'}$ (i.e., bins $b_c$ located at the pixel (x', y') with $|b_c-b_{x',y'}| \le r_B$ are then added to the sampling grid at location (x',y'). Repeating this for all $k_W \times k_W$ neighbors (including the center pixel) provides a sampling grid of size $k_W \times k_W \times k_B$. Diagram 200 visually depicts the process described above.

Figure 3:
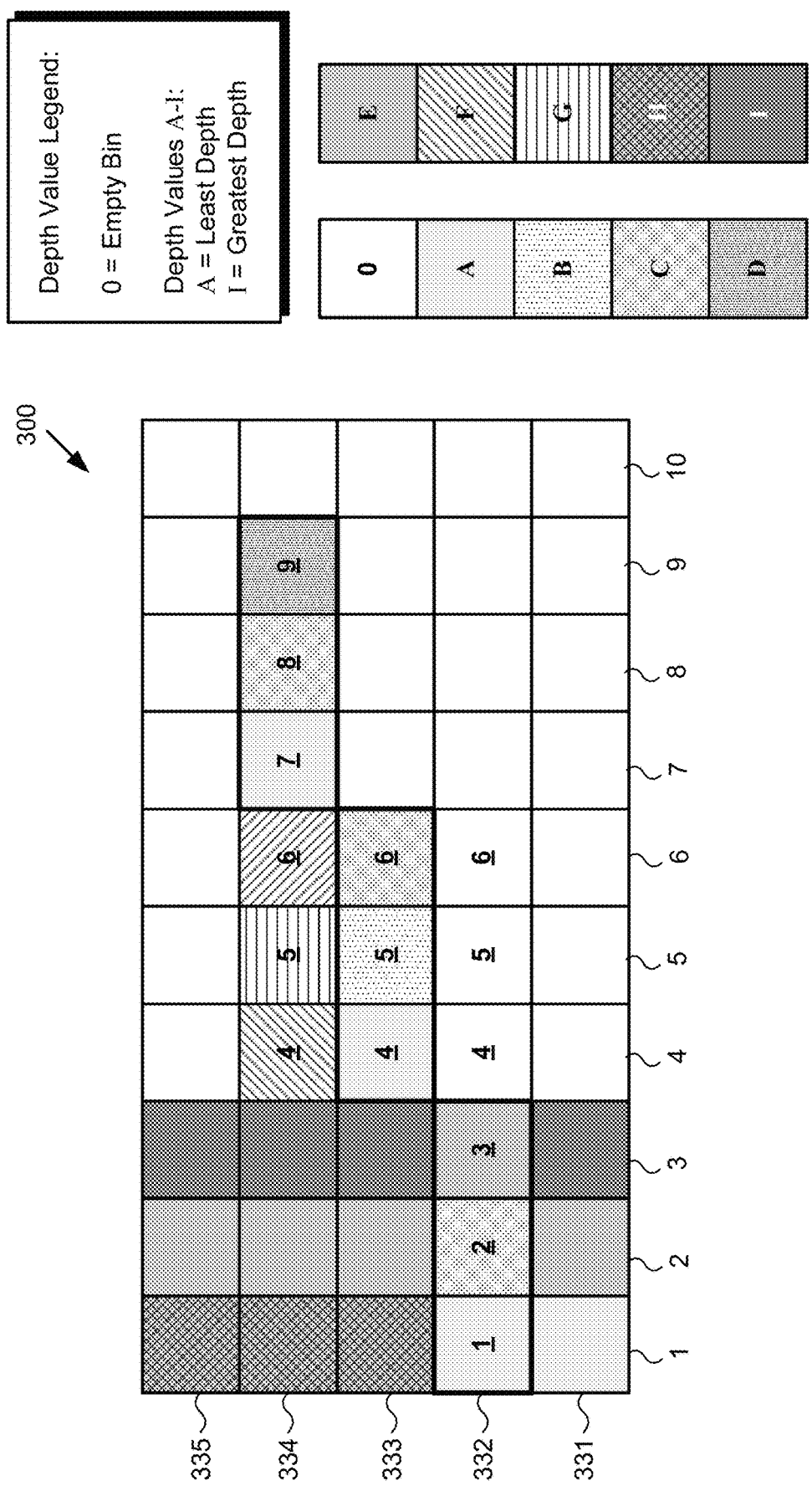
FIG. 3 shows a scanline of 3-D pixels undergoing depth-aware bin indexing, according to one implementation.

FIG. 3 shows scanline 300 of 3-D pixels undergoing depth-aware bin indexing, according to one implementation, and depicts the distinction between regular neighborhoods and depth aware neighborhoods. FIG. 3 shows 3-D pixels 331, 332, 333, 334 and 335 (hereinafter "pixels 331-335"), each including a plurality of bins 1, 2, 3, 4, 5, 6, 7, 8, 9 and 10, (hereinafter "bins 1-10"). It is noted that the respective bin fill color and pattern of each of the bins shown in FIG. 3 corresponds to the depth value of that bin.

Focusing on bin 5 of pixel 333, the regular neighborhood of bin 5 of pixel 333 in the conventional art includes only the nearest neighbor bins of pixel 5, i.e., bins 4, 5 and 6 in pixel 332, bins 4 and 6 in pixel 333, and bins 4, 5 and 6 in pixel 334, regardless of the depth values of those nearest neighbor bins. According to the depth-aware bin indexing approach disclosed in the present application, the identification of a relevant bin neighborhood for use in 3-D image denoising is more effectively performed by utilizing 1) the nearest neighbor bins of bin 5 of pixel 333 within pixel 333 (i.e., bins 4 and 6 in pixel 333) and a bin in each of nearest neighbor pixels 332 and 334 having a depth value closest to that of bin 5 of pixel 333 (i.e., bin 2 in pixel 332 and bin 8 in pixel 334), and 2) the nearest neighbor bins of those bins of the nearest neighbor pixels having the closest depth value, within their own respective pixels (i.e., bins 1 and 3 in pixel 332 and bins 7 and 9 in pixel 334). Thus, in contrast to conventional approaches to identifying a bin neighborhood, the present novel and inventive depth-aware approach to bin indexing identifies bins 1, 2 and 3 of pixel 332, bins 4 and 6 of pixel 333, and bins 7, 8 and 9 of pixel 334 as the relevant bin neighborhood for use with bin 5 of pixel 333. In other words, bins 1, 2 and 3 of pixel 332, bins 4 and 6 of pixel 333, and bins 7, 8 and 9 of pixel 334, together with "center" bin 5 of pixel 333, constitute a depth-aware bin group for use in denoising a 3-D image including pixels 331-335.

It is noted that the size of a relevant bin neighborhood, i.e., the number of bins included in the relevant bin neighborhood, is configurable, and in various implementations may include more or fewer bins than those described in the previous paragraph. For example, in a use case in which the relevant bin neighborhood for use with bin 5 of pixel 333 were to include only one bin from each of the nearest neighbor pixels of pixel 333, bin 2 of pixel 332, bins 4 and 6 of pixel 333, and bin 8 of pixel 334 would constitute the relevant bin neighborhood for use with bin 5 of pixel 333.

Figure 4:
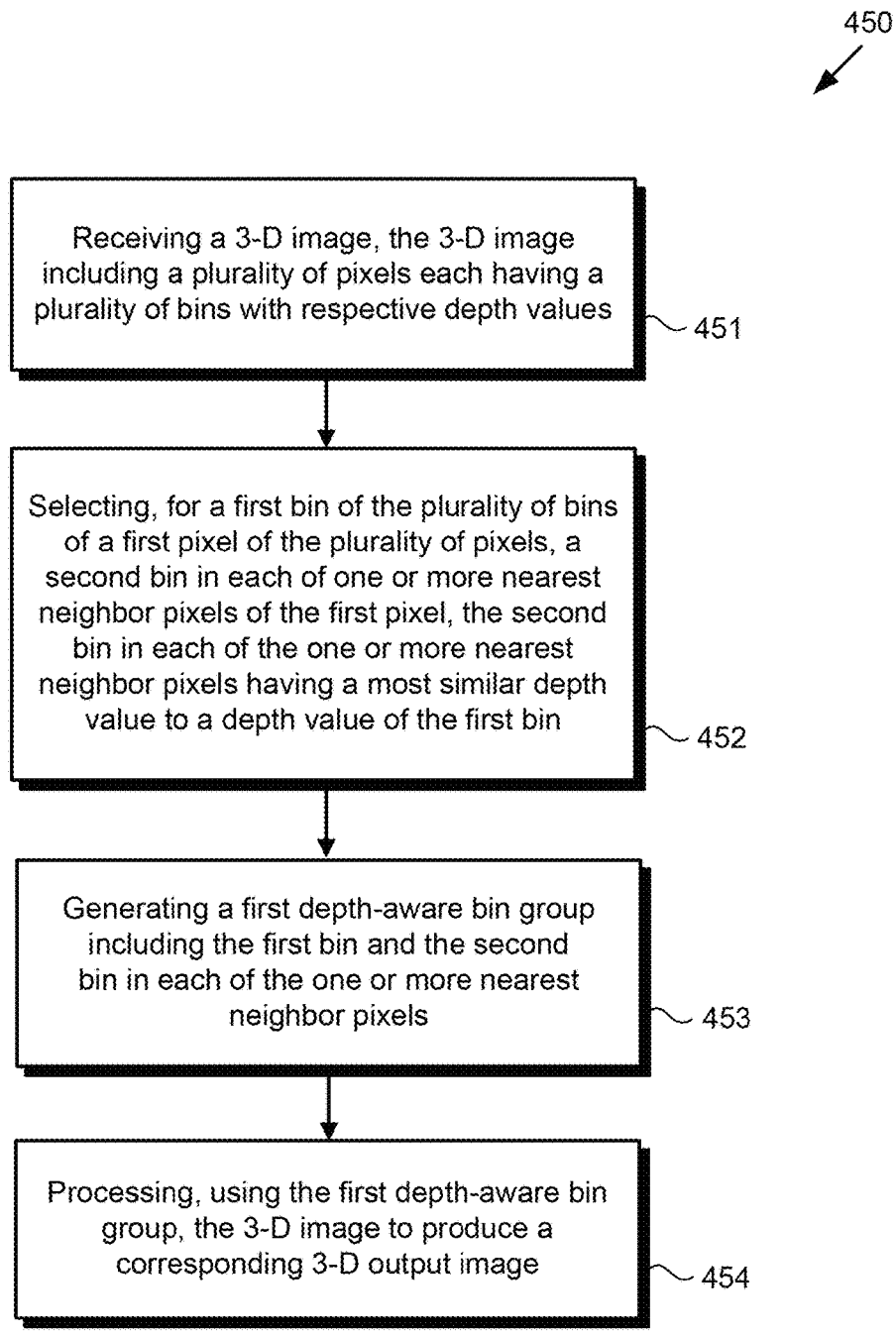
FIG. 4 shows a flowchart presenting an exemplary method for performing depth-aware indexing of 3-D image depth bins, according to one implementation.

The functionality of software code 110 of system 100 will be further described by reference to FIG. 4. FIG. 4 shows flowchart 450 presenting an exemplary method for performing depth-aware indexing of 3-D image depth bins, according to one implementation. With respect to the method outlined in FIG. 4, it is noted that certain details and features have been left out of flowchart 450 in order not to obscure the discussion of the inventive features in the present application.

Referring to FIG. 4, with further reference to FIGS. 1 and 3, flowchart 450 includes receiving 3-D image 120, 3-D image 120 including a plurality of pixels, (hereinafter exemplary "plurality of pixels 331-335" in FIG. 3) each having a plurality of bins with respective depth values (hereinafter exemplary "plurality of bins 1-10" in FIG. 3) (action 451). As noted above, in some implementations, 3-D image 120 may be a deep-Z image, for example. Moreover, according to the exemplary use case depicted by FIG. 1, 3-D image 120 is a noisy 3-D image. As shown in FIG. 1, in some implementations, 3-D image 120 may be received by system 100 from user system 116, via communication network 112 and network communication links 114. 3-D image 120 may be received, in action 451, by software code 110, executed by hardware processor 104 of system 100.

Continuing to refer to FIGS. 1, 3 and 4 in combination, flowchart 450 further includes selecting, for a first bin (e.g., bin 5) of plurality of bins 1-10 of a first pixel (e.g., pixel 333) of plurality of pixels 331-335, a second bin in each of one or more nearest neighbor pixels of pixel 333 (e.g., bin 2 in nearest neighbor pixel 332 and bin 8 in nearest neighbor pixel 334), the second bin in each of the one or more nearest neighbor pixels having a most similar depth value to a depth value of the first bin (action 452). Selecting the second bin in each of the one or more nearest neighbor pixels of the first pixel having a most similar depth value to a depth value of the first bin in the first pixel, in action 452, may be performed by software code 110, executed by hardware processor 104 of system 100, as described below.

It is noted that action 452 refers to selecting a second bin in each of one or more nearest neighbor pixels of pixel 333 to cover instances in which a particular pixel, e.g., pixel 331 has only one nearest neighbor pixel. However, the use of symmetric neighborhoods is common practice for image processing in order to preserve invariance of the method when the image is flipped or rotated by 90, 180, or 270 degrees. As a result, a second bin is typically selected in each nearest neighbor pixel when two nearest neighbor pixels are present.

It is further noted that in working with 3-D images, such as deep-Z images, it is assumed that the bins in each pixel are sorted by depth, from least to greatest. It is also assumed that the depth values are different for different bins within the same pixel. Depth-aware indexing takes the second bin with the closest depth value, which does not necessarily have to be the same depth value as the first bin. This assumption reduces the chance of multiple bins satisfying the "closest" criterion, but it can still happen (e.g. one bin with depth Z−1 and another bin with Z+1). For this case, depending on the particular implementation, a decision is made to consistently choose the bin with the lower or higher bin index.

In some instances, a second bin in a neighboring pixel having a closest depth value may lack symmetrical nearest neighbor bins within its own pixel, or may have an empty nearest neighbor bin in its own pixel. For example, if bin 1 of pixel 332 were to have been selected as the bin in pixel 332 having the closest depth value to bin 5 of pixel 333, rather than bin 2 of pixel 332, the 3-bin group from pixel 332 would be zero, bin 1 of pixel 332, and bin 2 of pixel 332. That is to say, zeros are added as padding to achieve the desired number of bins. Zero padding would also be used when the last bin (e.g., bin 9 of pixel 334) is used as the second bin.

As noted above, the input to the 3-D denoising kernels included as part of hybrid 2-D/3-D denoiser 160 is defined as a subset of neighboring bins selected based on depth information. That 3-D neighborhood (hereinafter "depth-aware bin group") has a user defined size of $k_W \times k_W \times k_B$ where $k_W = 2r_W + 1$ and $k_B = 2r_B + 1$ (e.g., in one implementation the depth-aware convolution used in the present 3-D image denoising solution use $k_W = k_B = 3$ and the depth-aware denoising kernels use $k_W = 5$ and $k_B = 3$). The coordinate of the center bin p=(x, y, b) is located within pixel (x, y).

A $k_W \times k_W$ spatial neighborhood N(x,y) is defined that is centered around pixel (x, y) and includes pixel (x, y) itself. Within each neighboring pixel (x',y')∈N(x,y), the coordinates of the set of neighboring bins is defined as (x', y', b')∈B(x', y'). The coordinates of the closest bin in depth for each neighboring pixel can be found by computing:

$$q^*(x', y'; p) = \text{argmin } q \in B(x', y') |z_c(p) - z_c(q)|, \quad \text{(Equation 1)}$$

where $z_c(\cdot)$ $$:= \frac{(z_f(\cdot) + z_b(\cdot))}{2}$$

denotes the center depth for a bin.

Continuing to refer to FIGS. 1, 3 and 4 in combination, flowchart 450 further includes generating a first depth-aware bin group including the first bin and the second bin in each of the one or more nearest neighbor pixels (action 453). It is noted that, as described above by reference to FIG. 3, in addition to the first bin and the second bin in each of the one or more nearest neighbor pixels, the first depth-aware bin group generated in action 453 further includes at least one of 1) nearest neighbor bins of the second bin in each of the one or more nearest neighbor pixels, or 2) nearest neighbor bins of the first bin in the first pixel. That is to say, according to the example depicted in FIG. 3, a depth-aware bin group for bin 5 of pixel 333 includes bins 4, 5 and 6 of pixel 333 (where bin 5 of pixel 333 is the first bin in the first pixel and bins 4 and 6 of pixel 333 are the nearest neighbor bins of the first bin in the first pixel), and one or both of 1) bins 1, 2 and 3 of pixel 332 (where bin 2 is the second bin in nearest neighbor pixel 332 and bins 1 and 3 are the nearest neighbor bins of the second bin in nearest neighbor pixel 332), or 2) bins 7, 8 and 9 of pixel 334 (wherein bin 8 is the second bin in nearest neighbor pixel 334 and bins 7 and 9 are the nearest neighbor bins of the second bin in nearest neighbor pixel 334). However, as noted, the size of a relevant bin neighborhood, i.e., the number of bins included in the relevant bin neighborhood, is configurable, and in various implementations may include more, or fewer bins than those described above. The generation of the first bin group, in action 453, may be performed by software code 110, executed by hardware processor 104 of system 100, as described below.

A set of bin coordinates from each pixel (x', y', b')∈$B_{r_B}$(q) with a bin index distance from q=(x',y', b), restricted by the user-defined size along the bin dimension |b−b'|; $r_B$ is identified. The depth-aware bin groups for use as inputs to the 3-D denoising kernels of hybrid 2-D/3-D denoiser 160 can then be constructed as:

$$Q_{DA}(x, y) = \bigcup (x', y') \in N(x, y) B_{rb}(q^*(x', y'; p)). \quad \text{(Equation 2)}$$

For comparison, a neighborhood with the regular neighboring indexing, i.e., a non-depth-aware conventional neighborhood, would be constructed as follows:

$$Q_S(x, y) = \bigcup (x', y') \in N(x, y) B_{rb}(q), \quad \text{(Equation 3)}$$

where in the regular non-depth-aware conventional neighborhood case q=(x', y', b) shares the same bin index b with the central bin at p. Compared to regular neighbor indexing, the present depth-aware approach to bin indexing, by using depth information, essentially shifts the bin dimension of all neighbors such that their central bin is as close as possible to the depth of bin p=(x, y, b).

Given the depth-aware bin indexing method, the operators of hybrid 2-D/3-D denoiser 160 can be defined as receiving per-bin input values 1(q) within the neighborhood $q \in Q_{DA}$ (p), and a denoising kernel K(q; p) of shape $k_W \times k_W \times k_B$, and computing a weighted sum Î(p)

$$\hat{I}(p) = \sum_{q \in Q_{DA}(p)} K(q; p) I(q). \quad \text{(Equation 4)}$$

Equation 4 describes both the application of depth-aware convolution kernels on feature maps inside hybrid 2-D/3-D denoiser 160 and the application of predicted depth-aware denoising kernels on noisy input channels, such as α(p) and c(p).

Referring to FIGS. 1 and 4 in combination, flowchart 450 further includes processing, using the first depth-aware bin group generated in action 453, 3-D image 120 to produce corresponding 3-D output image 140 (action 454). By way of overview, depth-aware convolutions are used in action 454 to extract features and then depth-aware denoising kernels are used to filter the noisy input image to get to the denoised image. The processing involved in producing 3-D output image 140 is described in greater detail below by reference to FIGS. 5, 6 and 7. According to the exemplary implementation shown by FIG. 1, the processing of 3-D image 120 performed in action 454 includes denoising of noisy 3-D image 120 to produce 3-D output image 140 as a denoised 3-D image corresponding to noisy 3-D image 120. However, it is noted that the method outlined by Flowchart 450 may be applied to any image processing workflow for which depth-awareness may be advantageous or desirable. The processing of 3-D image 120, in action 454, using the first depth-aware bin group generated in action 453 may be performed by software code 110, executed by hardware processor 104 of system 100, and using hybrid 2-D/3-D denoiser 160.

Referring to FIG. 3 in combination with FIG. 4, it is noted that actions 452 and 453 may be performed for each bin of each of plurality of pixels 331-335, until all or substantially all bins of all pixels have undergone depth-aware bin indexing. In other words, in addition to performing depth aware indexing of all bins of the first pixel of plurality of pixels 331-335, hardware processor 104 may further execute software code to generate depth aware bin groups for other pixels of plurality of pixels 331-335. Thus, hardware processor 104 of system 100 may further execute software code 110 to select, for a first bin of a plurality of bins of a second pixel of the plurality of pixels, a second bin in each of one or more nearest neighbor pixels of the second pixel, the second bin in each of one or more nearest neighbor pixels of the second pixel having a most similar depth value to a depth value of the first bin of the plurality of bins of the second pixel, generate a second depth-aware bin group including the first bin of the plurality of bins of the second pixel and the second bin in each of the one or more nearest neighbor pixels of the second pixel, and so forth for plurality of pixels 331-335. It is further noted that the processing of 3-D image 120 performed in action 454 may further use the first depth-aware bin group and the second depth-aware bin group, as well as any additional depth-aware bin groups generated as the result of additional iterations of actions 452 and 453.

Figure 5:
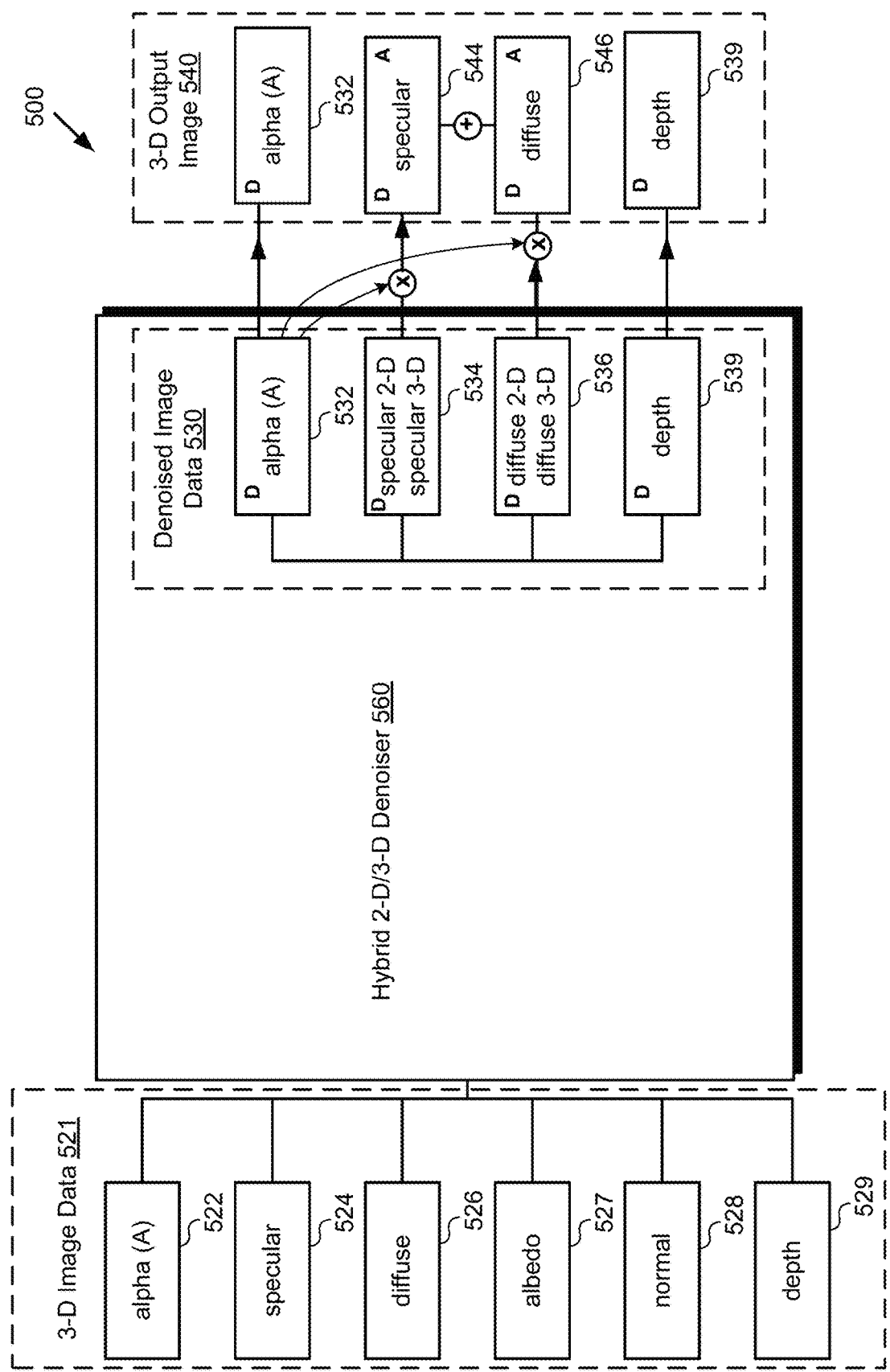
FIG. 5 shows an overview of a data flow for denoising 3-D images, according to one implementation.

FIG. 5 shows an overview of data flow 500 for denoising 3-D images, according to one implementation. As shown in FIG. 5, 3-D image data 521 is provided as an input to hybrid 2-D/3-D denoiser 560. It is noted that hybrid 2-D/3-D denoiser 560 corresponds in general to hybrid 2-D/3-D denoiser 160, in FIG. 1, and those corresponding features may share any of the characteristics attributed to either corresponding feature by the present disclosure. Referring to FIGS. 1 and 5 in combination, hybrid 2-D/3-D denoiser 160/560 is used to denoise 3-D image data 521 extracted from 3-D image 120 to provide denoised image data 530, which then has its denoised specular and diffuse features multiplied by the denoised alpha, i.e., opacity, of 3-D image 120 to produce 3-D output image 540 as a denoised 3-D image corresponding to 3-D image 120.

As further shown in FIG. 5, 3-D image data 521 includes a plurality of image feature channels, such as alpha channel 522 identifying the opacity of 3-D image 120, specular channel 524, diffuse channel 526, albedo channel 527, normal channel 528 and one or more depth channels 529 (hereinafter "depth channel(s) 529"). It is noted that "normal" refers to the surface normal vectors, while "albedo" refers to the surface reflectance. Together, the normal and albedo features provide details about the geometry and textures of objects and help improve denoising quality. It is further noted that specular channel 524, diffuse channel 526, albedo channel 527, and normal channel 528 identify the respective specular, diffuse, albedo and normal features of 3-D image 120 after the opacity identified by alpha channel 522 has been divided out of those features of 3-D image 120.

Denoised image data 530 provided by hybrid 2-D/3-D denoiser 160/560 includes denoised alpha channel 532, denoised specular channels 534 including separate denoised 2-D and 3-D specular channels, denoised diffuse channels 536 including separate denoised 2-D and 3-D diffuse channels, and one or more denoised depth channels 539 (hereinafter "denoised depth channel(s) 539"). It is noted that the 3-D specular features included in specular channel 524 are denoised to provide the denoised 3-D specular channel included among denoised specular channels 534, while the 3-D specular features included in specular channel 524 are flattened by alpha compositing and denoised to provide the denoised 2-D specular channel included among denoised specular channels 534. Similarly, the 3-D diffuse features included in diffuse channel 526 are denoised to provide the denoised 3-D diffuse channel included among denoised diffuse channels 536, while the 3-D diffuse features included in diffuse channel 526 are flattened by alpha compositing and denoised to provide the denoised 2-D diffuse channel included among denoised diffuse channels 536. Denoised alpha channel 532, denoised specular channels 534 including separate denoised 2-D and 3-D specular channels, denoised diffuse channels 536 including separate denoised 2-D and 3-D diffuse channels, and denoised depth channel(s) 539 correspond respectively to alpha channel 522, specular channel 524, diffuse channel 526 and depth channel(s) 529 of 3-D image data 521 after denoising of those input channels of 3-D image data 521 by hybrid 2-D/3-D denoiser 160/560.

It is further noted that although FIG. 5 depicts depth channel(s) 529 of 3-D image data 521 and denoised depth channel(s) 539 of denoised image data 530 and 3-D output image 540 as respective single channels, that representation is provided merely in the interests of conceptual clarity. In some implementations, depth channel(s) 529 and denoised depth channel(s) 539 may each include two depth channels, e.g., a "depthFront" channel and a "depthBack" channel. In those implementations, both channels together define the depth range that a bin covers. Nevertheless, in some implementations in which depth channel(s) 529 and denoised depth channel(s) 532 each include a depthFront channel and a depthBack channel, are often "single-depth" meaning that only the depthFront channel is active and the depthBack channel is presumed to be the same as depthFront.

In some implementations, 3-D image data 521 may be deep-Z image data extracted from 3-D image 120 in the form of a deep-Z image. As shown in FIG. 5, denoised specular channels 534 and denoised diffuse channels 536 are each multiplied by the denoised opacity identified by denoised alpha channel 532 and combined by being stored in the same output file to provide 3-D output image 540 including denoised output specular channel 544 and denoised output diffuse channel 546, as well as denoised alpha channel 532 and denoised depth channel(s) 539. According to the present exemplary implementation, denoised specular channels 534 and denoised diffuse channels 536 are each multiplied by the denoised opacity because the opacity identified by alpha channel 522 was previously divided out of the specular and diffuse features of 3-D image 120, as noted above. However, in implementations in which that previous dividing out of the opacity is omitted, the present multiplication by the denoised opacity may be omitted as well. 3-D output image 540 corresponds in general to 3-D output image 140 in FIG. 1, and those corresponding features may share any of the characteristics attributed to either corresponding feature by the present disclosure. Thus, like 3-D output image 140, in some implementations, 3-D output image 540 may be a denoised deep-Z image corresponding to 3-D image 120 in the form of a noisy 3-D image.

Figure 6:
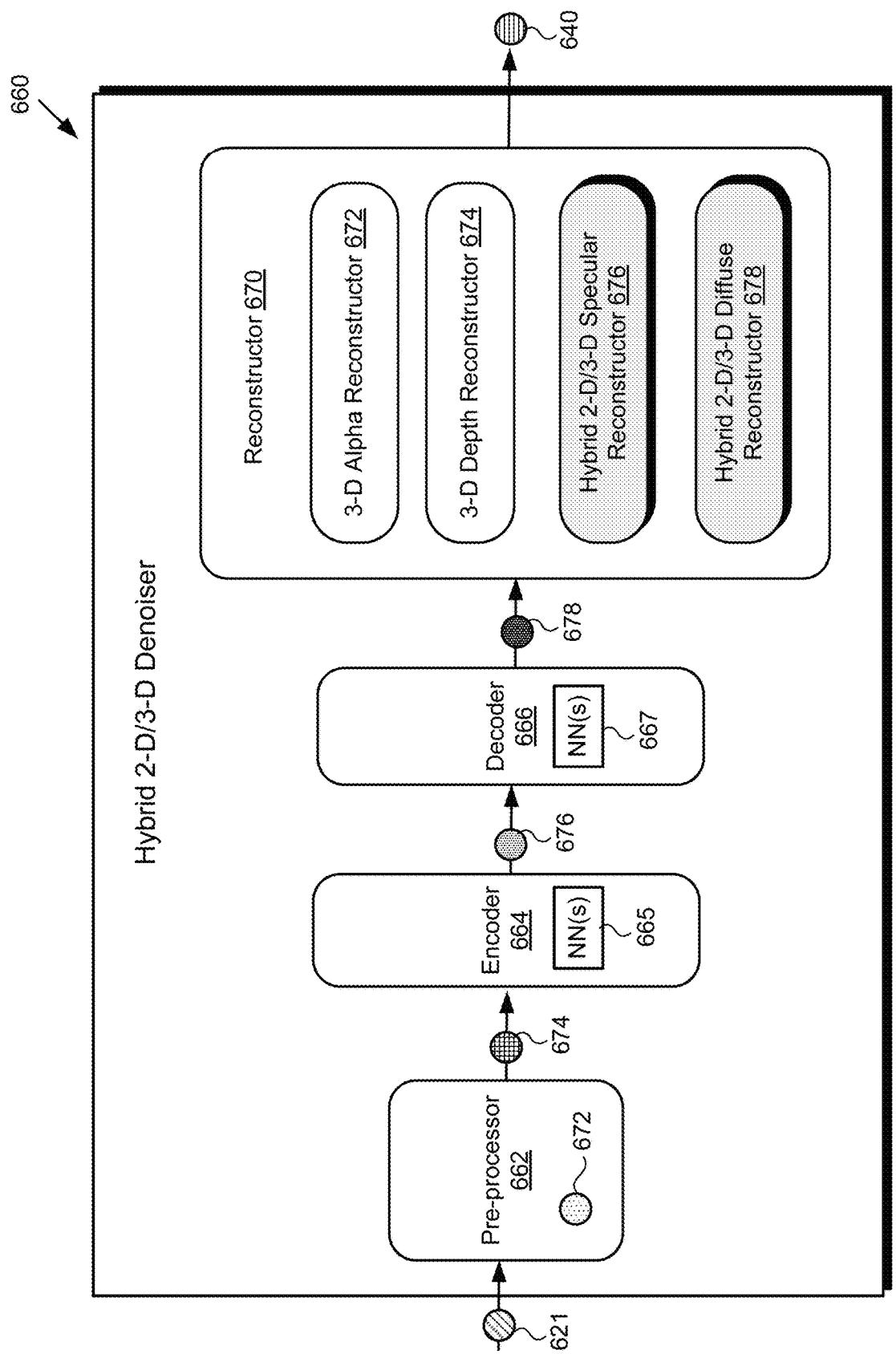
FIG. 6 shows a diagram of a hybrid two-dimensional and 3-D denoiser system for use in denoising 3-D images, according to one implementation.

Referring to FIG. 6, FIG. 6 shows a diagram of hybrid 2-D/3-D denoiser 660 for use in denoising 3-D images, according to one implementation. Hybrid 2-D/3-D denoiser 660 may be implemented using a U-Net architecture and may include pre-processor 662, encoder 664, decoder 666, and reconstructor 670 including 3-D alpha reconstructor 672, 3-D depth reconstructor 674, hybrid 2-D/3-D specular reconstructor 676 and hybrid 2-D/3-D diffuse reconstructor 678. As shown in FIG. 6, hybrid 2-D/3-D denoiser 660 receives 3-D image data 621 as an input and provides 3-D output image 640. Also shown in FIG. 6 are one or more NNs (hereinafter "NN(s)") 665 of encoder 664, NN(s) 667 of decoder 666, 2-D image data 672, concatenated image data 674, encoded data 676 and decoded data 678.

Hybrid 2-D/3-D denoiser 660 corresponds in general to hybrid 2-D/3-D denoiser 160/560 in FIGS. 1 and 5. Consequently, hybrid 2-D/3-D denoiser 160/560 may share any of the characteristics attributed to corresponding hybrid 2-D/3-D denoiser 660 by the present disclosure, and vice versa. That is to say, like hybrid 2-D/3-D denoiser 660, hybrid 2-D/3-D denoiser 160/560 may include pre-processor 662, encoder 664, decoder 666, and reconstructor 670. In addition, 3-D image data 621, in FIG. 6, corresponds in general to 3-D image data 521, in FIG. 5. Thus, 3-D image data 621 may share any of the characteristics attributed to 3-D image data 521 by the present disclosure, and vice versa. 3-D output image 640 corresponds in general to 3-D output image 140 and 540 in FIGS. 1 and 5, and those corresponding features may share any of the characteristics attributed to any of those corresponding features by the present disclosure. Thus, like 3-D output image 140, in some implementations, 3-D output image 640 may be a denoised deep-Z image corresponding to 3-D image 120 in the form of a noisy 3-D image. Moreover, like 3-D output image 540, 3-D output image 640 may include denoised output specular channel 544 and denoised output diffuse channel 546, denoised alpha channel 532, and denoised depth channel(s) 539.

Figure 7:
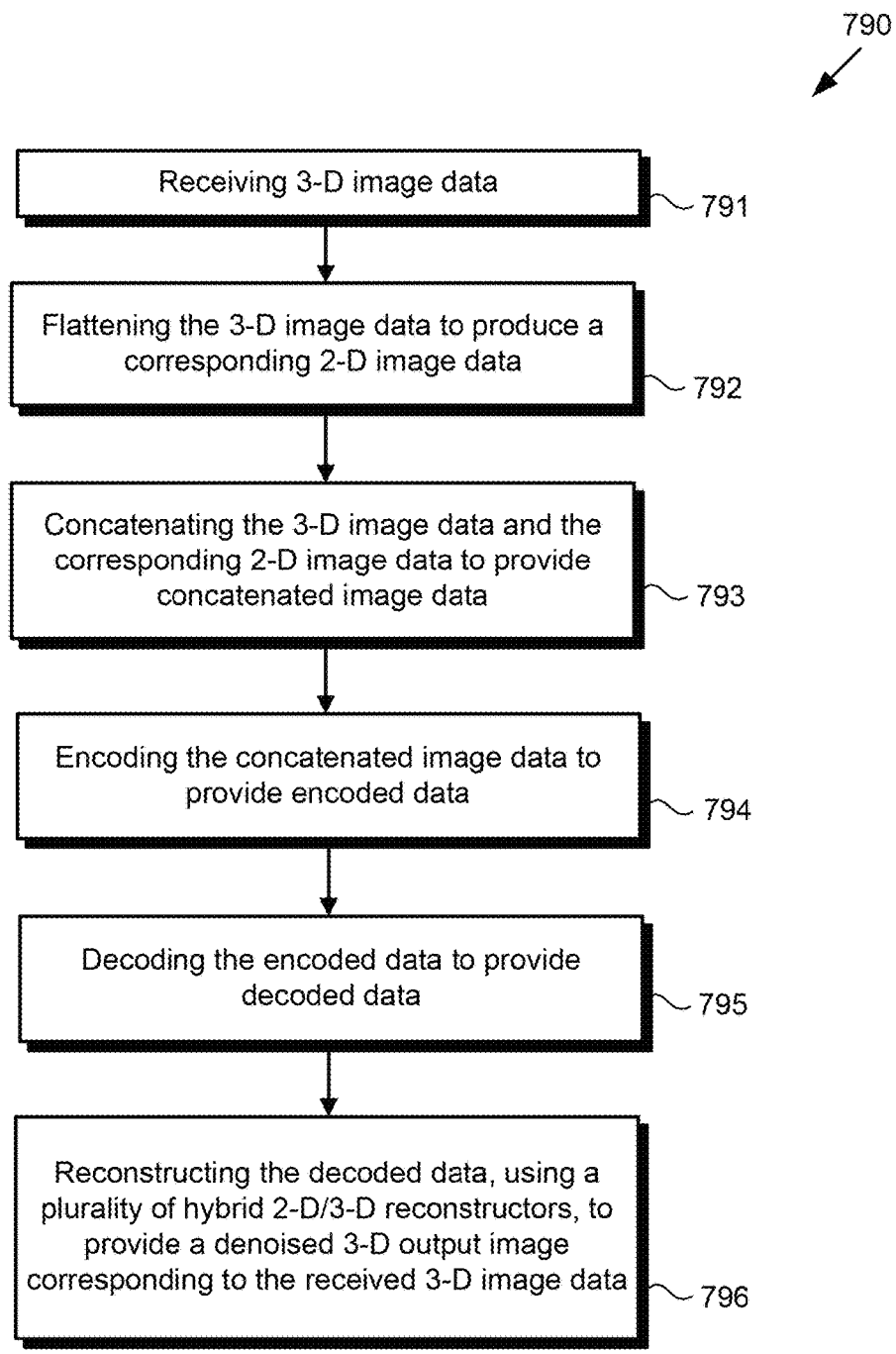
FIG. 7 shows a flowchart presenting an exemplary method for denoising 3-D images, according to one implementation.

The functionality of hybrid 2-D/3-D denoiser 160/560/660 will be further described by reference to FIG. 7. FIG. 7 shows flowchart 790 presenting an exemplary method for denoising 3-D images, according to one implementation. With respect to the method outlined in FIG. 7, it is noted that certain details and features have been left out of flowchart 790 in order not to obscure the discussion of the inventive features in the present application.

Referring to FIG. 7, with further reference to FIGS. 5 and 6, flowchart 790 includes receiving 3-D image data 521/621 (action 791). As noted above, and referring further to FIG. 1, 3-D image data 521/621 may be extracted from 3-D image 120, and in some use cases may be deep-Z image data extracted from 3-D image 120 in the form of a deep-Z image. Moreover, according to the exemplary use case, 3-D image data 521/621 is noisy 3-D image data. 3-D image data 521/621 may be received by pre-processor 662 of hybrid 2-D/3-D denoiser 160/560/660, which is configured to receive 3-D image data 521/621 in action 791.

Continuing to refer to FIGS. 1, 5, 6 and 7 in combination, flowchart 790 further includes flattening 3-D image data 521/621 to produce corresponding 2-D image data 672 (action 792). 3-D image data 521/621 may be flattened by alpha compositing to produce corresponding 2-D image data 672, by pre-processor 662 of hybrid 2-D/3-D denoiser 160/560/660, which is further configured to perform such flattening in action 792.

Continuing to refer to FIGS. 1, 5, 6 and 7 in combination, flowchart 790 further includes concatenating 3-D image data 521/621 and corresponding 2-D image data 672 to provide concatenated image data 674 (action 793). 3-D image data 521/621 and corresponding 2-D image data 672 may be concatenated to provide concatenated image data 674 by pre-processor 662 of hybrid 2-D/3-D denoiser 160/560/660, which is further configured to perform that concatenation in action 793.

Referring to FIGS. 1, 6 and 7 in combination, flowchart 790 further includes encoding concatenated image data 674 to provide encoded data 676 (action 794). The encoding of concatenated image data 674 to provide encoded data 676, in action 794, may be performed by encoder 664 of hybrid 2-D/3-D denoiser 160/560/660. According to the exemplary implementation shown in FIG. 6, encoder 664 includes NNs 665, which may take the form of CNNs for example, and encoder 664 may be configured to use NNs 665 to encode concatenated image data 674. Moreover, the encoding performed by encoder 664, in action 794, may be performed on depth-aware bin groups, as those features are described above.

Continuing to refer to FIGS. 1, 6 and 7 in combination, flowchart 790 further includes decoding encoded data 676 to provide decoded data 678 (action 795). The decoding of encoded data 676 to provide decoded data 678, in action 795, may be performed by decoder 666 of hybrid 2-D/3-D denoiser 160/560/660. According to the exemplary implementation shown in FIG. 6, decoder 666 includes NNs 667, which may take the form of CNNs for example, and decoder 666 may be configured to use NNs 667 to decode encoded data 676. Moreover, the decoding performed by decoder 666, in action 795, may be performed on depth-aware bin groups.

Referring to FIGS. 1, 5, 6 and 7 in combination, flowchart 790 further includes reconstructing decoded data 678, using a plurality of hybrid 2-D/3-D reconstructors, to provide denoised 3-D output image 140/540/640 corresponding to 3-D image data 521/621 (action 796). In some implementations, each of encoder 664, decoder 666 and reconstructor 670 may be a multi-scale processing block of hybrid 2-D/3-D denoiser 160/560/660 that includes a plurality of levels, such as three levels or any other desired number of levels, configured to denoise 3-D image data at a different respective resolution. To produce 3-D output image 140/540/640, the respective outputs of 3-D and 2-D reconstruction heads included in hybrid 2-D/3-D specular reconstructor 676 and hybrid 2-D/3-D diffuse reconstructor 678 are combined at the finest scale. By flattening the per-bin feature embedding from the U-Net (averaging across the bin dimension), the per-pixel feature embedding at each scale can be obtained. Taking these per-pixel feature maps as inputs, a 2-D multi-scale kernel-predicting reconstruction head of each of hybrid 2-D/3-D specular reconstructor 676 and hybrid 2-D/3-D diffuse reconstructor 678 can then denoise the flattened noisy image. Finally, the denoised 2-D image is combined with the denoised 3-D result by a learned weighted average, whose weights are predicted from the embeddings from the finest scale of the U-Net for each bin.

The reconstruction of decoded data 678, in action 796, may be performed by reconstructor 670 of hybrid 2-D/3-D denoiser 160/560/660. According to the exemplary implementation shown in FIG. 6, reconstructor 670 includes 3-D alpha reconstructor 672 configured to provide denoised alpha channel 532 of denoised 3-D output image 140/540/640, as well as 3-D depth reconstructor 674 configured to provide denoised depth channel(s) 539 of denoised 3-D output image 140/540/640. Reconstructor 670 also includes hybrid 2-D/3-D specular reconstructor 676 configured to provide denoised specular channels 534 of denoised image data 530/630, where denoised specular channels 534 include denoised 2-D and 3-D specular channels that are merged using the learned weighted averaging described above to provide denoised output specular channel 544 of 3-D output image 140/540/640. In addition, reconstructor 670 includes hybrid 2-D/3-D diffuse reconstructor 678 configured to provide denoised diffuse channels 536 of denoised image data 530/630, where denoised diffuse channels 536 include denoised 2-D and 3-D diffuse channels that are merged using the learned weighted averaging described above to provide denoised output diffuse channel 546 of 3-D output image 140/540/640. Thus, denoised 3-D output image 140/540/640 is provided using denoised image data 530/630 processed by the reconstructor 670, denoised image data 530/630 including denoised 2-D and 3-D specular channels and 2-D and 3-D diffuse channels.

It is noted that each of hybrid 2-D/3-D specular reconstructor 676 and hybrid 2-D/3-D diffuse reconstructor 676 includes a 3-D denoising kernel that is applied to 3-D noisy images and which, in some implementations, may receive depth-aware bin groups as inputs. It is further noted that each of hybrid 2-D/3-D specular reconstructor 676 and hybrid 2-D/3-D diffuse reconstructor 678 includes a 2-D denoising kernel that is applied to 2-D noisy images.

With respect to the methods outlined by flowcharts 450 and 790 of respective FIGS. 4 and 7, it is noted that actions 451, 452 and 453 and 454, as well as actions 791, 792, 793, 794, 795 and 796, may be performed as automated processes from which human participation may be omitted.

Thus, the present application discloses a neural 3-D denoiser and depth aware bin indexing approach that achieves high-quality denoising of 3-D images, such as deep-Z images. The denoising solution disclosed in the present application utilizes a hybrid 2-D/3-D architecture to improve denoising of flat image regions and uses depth as a prior for aligning bin neighborhoods. The present 3-D image denoising solution advances the state-of-the-art by introducing a denoiser capable of producing high-quality denoised 3-D images while being significantly more efficient than previous non-neural methods. The hybrid 2-D/3-D denoiser disclosed herein adopts a hybrid 2-D/3-D network architecture with flattened pixel context and learned combination of flat and deep reconstruction. The present 3-D image denoising solution further advances the state-of-the-art by introducing a light-weight depth-aware neighbor indexing of the input of convolutions and denoising kernels that addresses depth misalignment in 3-D image data.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a pre-processor configured to:
        receive three-dimensional (3-D) image data;
        flatten the 3-D image data to produce corresponding two-dimensional (2-D) image data; and
        concatenate the 3-D image data and the corresponding 2-D image data to provide concatenated image data;
    an encoder including one or more first neural networks (NNs), the encoder configured to use the one or more first NNs to encode the concatenated image data to provide encoded data;
    a decoder including one or more second NNs, the decoder configured to use the one or more second NNs to decode the encoded data to provide decoded data; and
    a reconstructor including a plurality of hybrid 2-D/3-D reconstructors configured to reconstruct the decoded data to provide a denoised 3-D output image corresponding to the 3-D image data.

2. The system of claim 1, wherein the encoder, the decoder and the reconstructor each comprises a plurality of levels each configured to denoise the 3-D image data at a different respective resolution.

3. The system of claim 1, wherein the denoised 3-D output image is provided using denoised image data processed by the reconstructor, the denoised image data including denoised 2-D and 3-D specular channels and 2-D and 3-D diffuse channels.

4. The system of claim 1, wherein the 3-D image data comprises deep-Z image data.

5. The system of claim 1, wherein the one or more first NNs and the one or more second NNs comprise convolutional NNs (CNNs).

6. The system of claim 1, wherein encoding and decoding are performed on depth-aware bin groups.

7. The system of claim 1, wherein each of the plurality of hybrid 2-D/3-D reconstructors comprises a 2-D reconstructor including a 2-D denoising kernel, and a 3-D reconstructor including a 3-D denoising kernel receiving depth-aware bin groups as inputs.

8. The system of claim 1, wherein the 3-D image data comprises an alpha channel, a specular channel, a diffuse channel and at least one depth channel.

9. The system of claim 1, wherein the denoised 3-D output image comprises a denoised alpha channel, a denoised specular channel, a denoised diffuse channel and at least one denoised depth channel.

10. The system of claim 9, wherein each of the denoised specular channel and the denoised diffuse channel is multiplied by a denoised opacity provided by the denoised alpha channel of the denoised 3-D output image.

11. A method for use by a system to denoise three-dimensional (3-D) image data, the method comprising:
receiving the 3-D image data;
flattening the 3-D image data to produce a corresponding two-dimensional (2-D) image data;
concatenating the 3-D image data and the corresponding 2-D image data to provide concatenated image data;
encoding the concatenated image data to provide encoded data;
decoding the encoded data to provide decoded data; and
reconstructing the decoded data, using a plurality of hybrid 2-D/3-D reconstructors of the system, to provide a denoised 3-D output image corresponding to the 3-D image data.

12. The method of claim 11, wherein encoding, decoding and reconstructing are each performed at a plurality of levels corresponding respectively to different data resolutions.

13. The method of claim 11, wherein the denoised 3-D output image is provided using denoised image data processed by the reconstructor, the denoised image data including denoised 2-D and 3-D specular channels and 2-D and 3-D diffuse channels.

14. The method of claim 11, wherein the 3-D image data comprises deep-Z image data.

15. The method of claim 11, wherein encoding is performed using one or more first neural networks (NNs), and wherein decoding is performed using one or more second NNs.

16. The method of claim 11, wherein encoding and decoding are performed on depth-aware bin groups.

17. The method of claim 11, wherein each of the plurality of hybrid 2-D/3-D reconstructors comprises a 2-D reconstructor including a 2-D denoising kernel, and a 3-D reconstructor including a 3-D denoising kernel receiving depth-aware bin groups as inputs.

18. The method of claim 11, wherein the 3-D image data comprises an alpha channel, a specular channel, a diffuse channel and at least one depth channel.

19. The method of claim 11, wherein the denoised 3-D output image comprises a denoised alpha channel, a denoised specular channel, a denoised diffuse channel and at least one denoised depth channel.

20. The method of claim 19, wherein each of the denoised specular channel and the denoised diffuse channel is multiplied by a denoised opacity provided by the denoised alpha channel of the denoised 3-D output image.

* * * * *